G. H. GEE.
AUTO DUMP TRUCK.
APPLICATION FILED AUG. 18, 1921.
1,432,328. Patented Oct. 17, 1922.
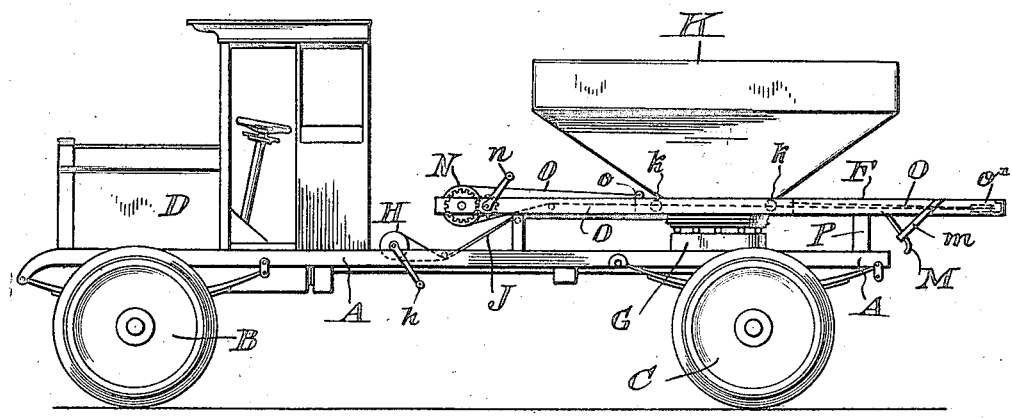
Inventor
George H. Gee
by his Attorneys

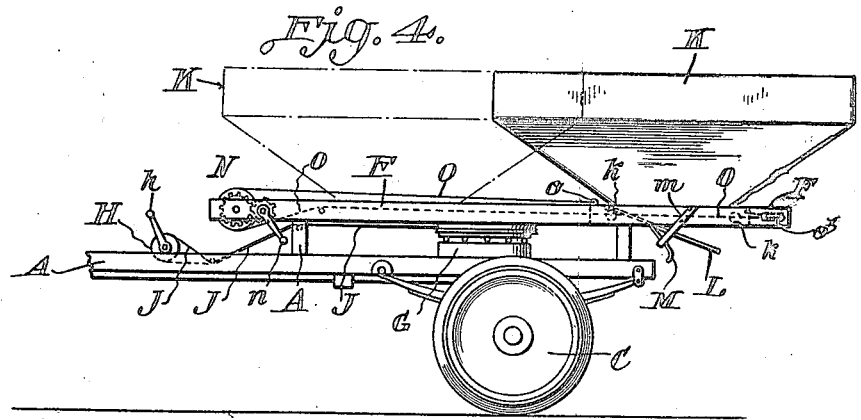
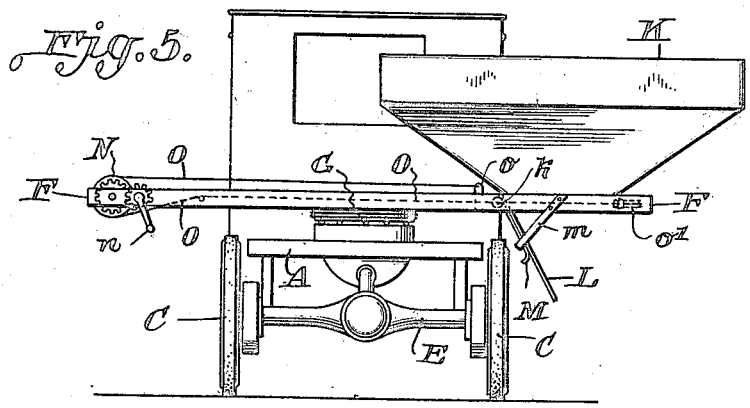

Patented Oct. 17, 1922.

1,432,328

UNITED STATES PATENT OFFICE.

GEORGE H. GEE, OF DANVILLE, VIRGINIA.

AUTO DUMP TRUCK.

Application filed August 18, 1921. Serial No. 493,201.

*To all whom it may concern:*

Be it known that I, GEORGE H. GEE, a citizen of the United States, residing at Danville, in the county of Pittsylvania and State of Virginia, have invented certain new and useful Improvements in Auto Dump Trucks, of which the following is a specification.

This invention relates to what are known as "motor-driven dump trucks," in which provision is made for discharging the load from the container when the latter is moved to discharging position either behind the truck or to one side thereof, and the object of the invention is to provide improved means for supporting the container and for shifting its position to equalize the weight of the load on the truck and to discharge the load on either side of the truck or at the rear thereof.

In carrying out my invention I provide a motor driven truck on which is mounted a load supporting frame which is mounted on a turntable whereby the load supporting frame may be moved to a position either lengthwise of the truck or crosswise thereof. This frame supports a hopper bottom container which is movable longitudinally of the load supporting frame. Provision is made for turning the frame about the axis of the turntable and for moving the container longitudinally of its supporting frame.

My improvements are illustrated in the accompanying drawings, in which:—

Figure 1 is a side elevation of an auto dump truck embodying my improvements.

Figure 2 is a plan view thereof.

Figure 3 is a transverse sectional view showing certain details of construction.

Figure 4 is a side elevation of the rear portion of the truck, showing different positions of the load container.

Figure 5 shows a rear elevation of the truck with the load container shifted to one side thereof.

The truck proper may be of any suitable construction. Briefly stated, it comprises a chassis A supported on front and rear wheels B and C. An engine may be located at D and said engine may be connected in any suitable way with the rear wheels at E as indicated in Figure 5.

A load supporting frame F is supported on the chassis A by means of a turntable G so that the frame may be turned about the axis of the table to assume a position lengthwise of the truck or crosswise thereof. The frame F may be made of channel iron as shown, its side members providing guides for the container whereby the latter may be moved longitudinally of the frame.

For turning the frame F horizontally about the axis of the turntable, I employ a winch H operated by a crank handle $h$ and connected by a rope, chain or cable J with the turntable. By these means the frame may be turned from a position lengthwise of the truck to a position crosswise thereof as indicated in Figure 2.

The container K is preferably of the kind shown, having a hopper bottom closed by a gate L pivoted at its inner end to the container. When the container is located in the middle portion of the frame F, the gate L of the container is held closed by rails M supported in the frame F. The rear ends of the rails are turned downward as shown and support the gate when the latter is lowered. Braces $m$ support the rear ends of the rails. Gate L of the container is adjustable to any angle.

In order to move the container longitudinally in the frame F, I employ a winch N operated by a handle $n$ and connected by a rope, chain or cable O with the bottom frame of the container as indicated at $o$. This rope, chain or cable extends to the rear end of the frame F and passes around a pulley $o'$ and is then connected with the container. By these devices the container may be moved longitudinally in its supporting frame. Cross pieces P serve to support the rails M as indicated. The bottom frame of the container K is provided with rollers $k$ which travel in the channel irons forming the sides of the frame F.

By the mechanism shown the load container K may be moved to such a position on the truck as to equalize or balance the weight of the load on the truck. This is an important feature of the invention. If it be desired to dump the load at the rear of the truck, the container is moved rearwards on the frame F until the gate L reaches the ends of the rails M when the gate will automatically drop, being sustained by the rear ends of the rails M as shown.

If it be desired to dump the load at the side of the truck, the frame F is turned about the axis of the turntable as indicated in Figures 2, 4 and 5. When the container is moved to the extended end of the frame, the gate is automatically lowered and the load is discharged.

I claim as my invention:—

1. An auto dump truck, comprising a wheel-supported frame, a load-supporting frame mounted thereon to turn about a vertical axis, a container supported in the load-supporting frame and mounted to move longitudinally therein, and means for turning the load-supporting frame about a vertical axis and for moving the container longitudinally in its supporting frame.

2. An auto dump truck, comprising a wheel-supported frame, a load-supporting frame mounted therein to turn about a vertical axis and provided with gate-supporting rails, a container supported on the frame and having a dumping gate supported by the rails, means for moving the load container longitudinally in its supporting frame, and means for moving said frame about a vertical axis.

3. An auto dump truck, comprising a wheel-supported frame, a turntable thereon, a load-supporting frame mounted on the turntable, means for turning the load-supporting frame about the axis of the turntable, gate-supporting rails on the load-supporting frame, a container movable lengthwise of the load-supporting frame and having a dumping gate supported by the rails, and means for turning the load-supporting frame about a vertical axis and for moving the container lengthwise of said load-supporting frame.

In testimony whereof, I have hereunto subscribed my name.

GEORGE H. GEE.